United States Patent [19]

Brewer

[11] E Re. 28,797

[45] Reissued May 4, 1976

[54] LID

[75] Inventor: Clarence T. Brewer, Oak Park, Ill.

[73] Assignee: Solo Cup Company, Urbana, Ill.

[22] Filed: July 30, 1975

[21] Appl. No.: 600,413

Related U.S. Patent Documents

Reissue of:

[64] Patent No.: 3,583,596
Issued: June 8, 1971
Appl. No.: 843,671
Filed: July 22, 1969

[52] U.S. Cl. ..... 220/306; 206/508
[51] Int. Cl.[2] ..... B65D 41/16; B65D 41/18
[58] Field of Search ..... 220/306, 355, 374; 229/43, 1.5 B; 150/.5; 206/508

[56] References Cited

UNITED STATES PATENTS

| | | | |
|---|---|---|---|
| 2,922,563 | 1/1960 | Aldington | 229/43 |
| 3,193,130 | 7/1965 | Miller | 220/374 |
| 3,353,708 | 11/1967 | Davis | 220/306 |
| 3,384,265 | 5/1968 | Frank | 206/508 |
| 3,632,016 | 6/1972 | Bozek | 220/355 |
| 3,895,736 | 7/1975 | Swett | 220/306 |

*Primary Examiner*—George T. Hall
*Attorney, Agent, or Firm*—Fitch, Even, Tabin & Luedeka

[57] ABSTRACT

A coverall lid or closure for gripping and sealing engagement with the bead of a cuplike container. The lid includes a central panel which is connected to a circumferential cavity by means of a corrugated ring. The cavity is adapted to receive the bead of the container and abut the bead in sealed engagement. A conical skirt extends downward and outward from the lower edge of the cavity. The upper portion of the skirt and the lower portion of the cavity form a waist and this waist is interrupted by a series of circumferentially spaced flutes. The portion of the skirt between the flutes act as lands, each land having a decreasing circumferential extent from a lower portion to an inner portion thereof to facilitate flexing of the lands radially outward when engaged by the container bead. The lower portion of the cavity is moveable into position beneath the bead to grip the latter when the lid is fitted on the container.

19 Claims, 5 Drawing Figures

INVENTOR
CLARENCE T. BREWER

Anderson, Luedeka, Fitch, Even, & Tabin
ATTYS.

INVENTOR
CLARENCE T. BREWER

Anderson, Luedeka, Fitch, Even & Tabin
ATTYS.

LID

Matter enclosed in heavy brackets [ ] appears in the original patent but forms no part of this reissue specification; matter printed in italics indicates the additions made by reissue.

This invention relates to lids for cuplike containers and more particularly to lids of the single end use, disposable type for cuplike containers having a curled top edge or bead.

Cuplike containers, having their top edges curled outwardly, downwardly and back under to form curled rims or beads, are commonly used to package foods, both solid and liquid, especially for carryout and end-point serving. Such containers are generally of the tapered or conical nesting type. The containers may be manufactured from sheet paper, treated or saturated with wax or a combination of wax and plastic, or from sheet paper laminated to thin plastic which serves as the interior of the container. Alternately, the cuplike containers may be post-treated with a coating, or a saturated coating, of wax or of a combination of wax and plastic. Containers of the above-described type may also be manufactured from sheet plastic by the thermovacuum-pressure forming process. In both the paper and plastic manufacturing processes, it is common practice to form the body of the container in one operation and the head in another operation, with both operations being automatically and progressively performed in one machine.

Variations in material characteristics, in sheet thickness and in manufacturing tools and processes cause dimensional tolerances in the container mouth diameter and the size or thickness of the bead that are difficult to economically control below a certain minimum. There are roundness irregularities in the circumference of the container and there are also variations in the uniformity of the bead size around the top edge of the container. Also, the bead is not exactly round; it is normally either round or egg-shaped with the top edge having the smaller curvature. The bead in containers made of sheet paper has a slightly enlarged portion resulting from the side seam of such containers.

The lid for such a container, in order to fit snugly on the container and be reasonably leaktight, should compensate for these nonuniformities or irregularities in the bead and container mouth and the variations between containers. Of course, the lid should be easy to apply to, or remove from the container. Other desirable features which should be provided in the lid are: (1) The lid should have sufficient retention on the container so that when two or more full containers with attached lids are placed in a bag or package in juxtaposition with the edge of the lid of one container overhanging one or more other lids, the weight of that one container does not peel or rake off the lid; (2) When the container with the attached lid is held or lifted by gripping opposite sides of the skirt of the lid with the thumb and fingers, the retention of the lid on the container should be increased; (3) The skirt of the lid should be of sufficient length to provide sanitary protection for the lip area when lifting or holding the container with the attached lid in the above-described manner; (4) For ease of manufacture, the lid should be of such a design that it is easy to form by a thermovacuum-pressure forming process and is easy to strip from the mold.

Stacking of the lid is another important consideration, particularly where the lids are picked up, conveyed or transported to packaging for shipment or where the lids are dispensed to end use. The lids should nest freely, one with the other, and should nest uniformly laterally so as to form a very rigid column that can be compressively picked up or conveyed by the ends of the stack. The lids should maintain this uniform stack in a shipping carton and be capable of separation from nesting without resistance for dispensing to end use.

An object of the present invention is to provide a lid which incorporates one or more of the above desirable features.

Other objects and advantages of the invention will become apparent from the detailed description taken in connection with the accompanying drawings in which.

Figure 3:
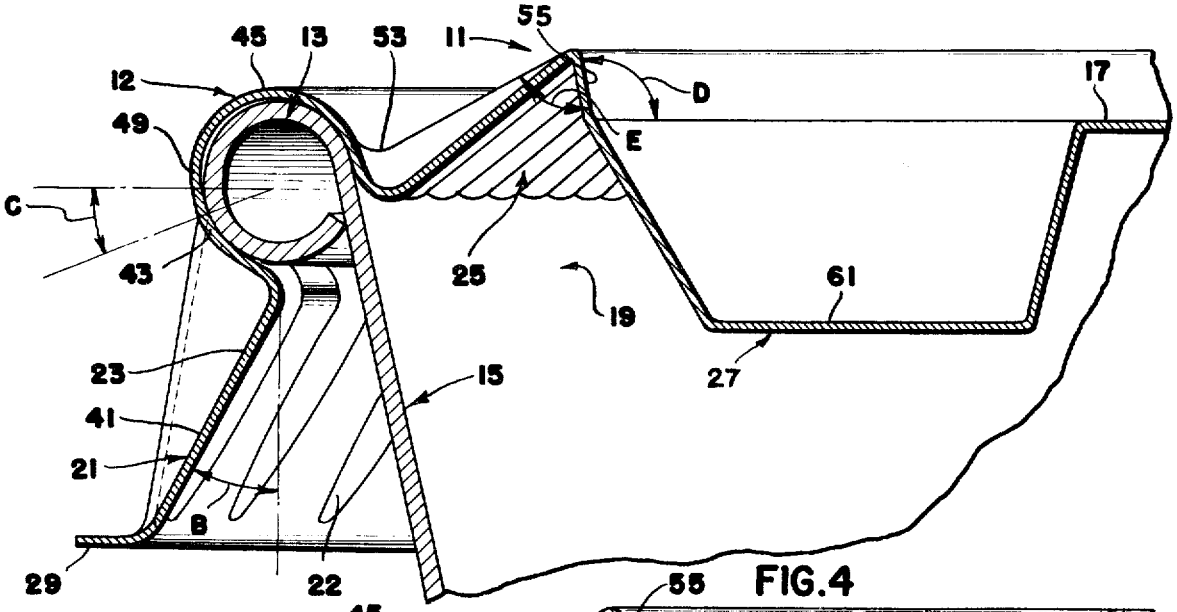
FIG. 3 is an enlarged fragmentary, cross-sectional view of a lid on a container.
Figure 4:
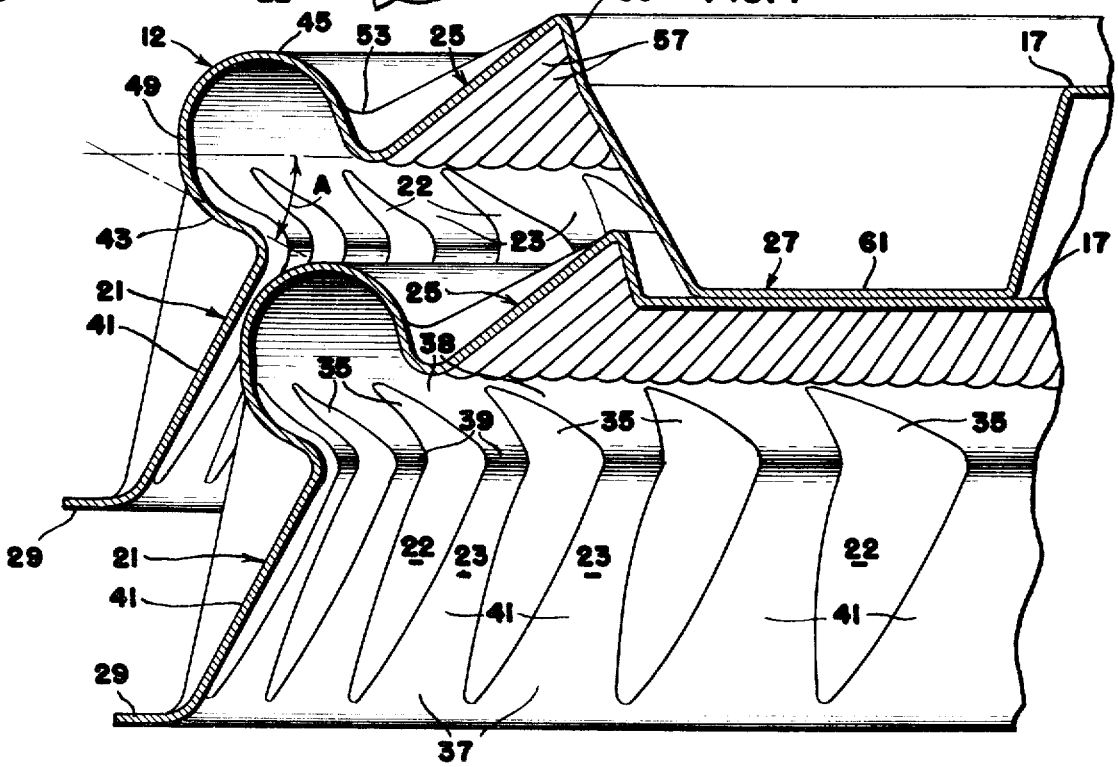
FIG. 4 is an enlarged fragmentary, cross-sectional view of several lids in a stack.
Figure 5:
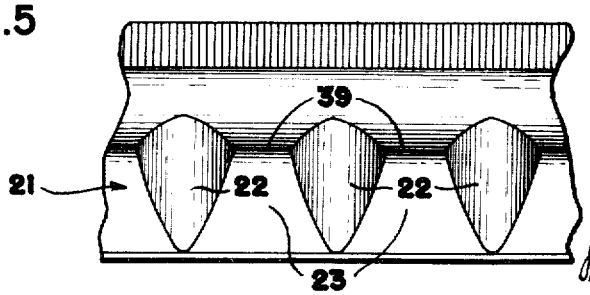
FIG. 5 is an enlarged fragmentary view of flutes and lands on the lid.

As shown in the drawings, a lid 11 is provided having a circumferentially extending cavity 12 (as best seen in FIG. 3) for releasable sealing engagement with a bead 13 of a cuplike container 15 which may be either made by vacuum forming sheet plastic or made from sheet paper, as previously described. The lid 11 is formed with a central disclike panel 17 adapted to extend substantially across the open mount 19 of the container when the lid is telescoped on the container. The lid also includes a conical lid skirt 21 which extends downward from the lower edge of the cavity 12. The lower portion of the cavity 12 and the upper portion of the skirt 21 form a waist and this waist is interrupted by a series of circumferentially spaced flutes 22. In telescoping the lid 11 on the container 15, the portions 23 of the skirt between the flutes 22 act as lands 23 which are cammed laterally outward by the bead 13 of the container thereby expanding the waist to permit it to pass over the container bead 13. A corrugated ring 25 is disposed between the cavity 12 and the central panel 17, for a purpose described hereinafter. The lid 11 is provided with stacking lugs 27 projecting downwardly from the central panel to rest on the top of the central panel of a lid immediately beneath it, as best seen in FIG. 4.

Referring now in greater detail to the embodiment shwon in the drawings, the lid 11 is preferably designed so that it is easily manufactured from a plastic sheet by a thermovacuum-pressure forming process and is easily stripped from its mold. For purposes of description, the lid 11 is described as it would be viewed from the container or its underside. The lid 11 includes the conical skirt 21 which, as illustrated, flares generally downward and outward from the lower portion of the cavity 12 to a maximum diameter at its lower free edge. Along the lower edge of the skirt 21 is an outward extending and substantially horizontal flange 29 which may be employed as a surface to be pushed for detaching the lid 11 from the container 15. This flange, which is necessary for presently available trimming operations, should be as narrow as possible to minimize the possibility of the lid being raked off by adjacent containers, as previously described.

When the lid 11 is initially placed on the container, it is normally skewed with one side of the bead 13 seated fully in the cavity 12. The inner diameter of the lower free edge of the skirt 21 is made of sufficient diameter to cover the maximum tolerance outside diameter of the container bead 13 when the lid 11 is in the skewed position on the container. The skirt 21 is made of sufficient length to provide a low-pressure angle as the skirt slides over the bead 13. When the lid 11 is attached to the container 15, the skirt 21 provides sanitary protection for the lip area about the container mouth.

The upper portion of the skirt 21 and the lower portion of the cavity 12 form a waist. The waist is interrupted by a series of circumferentially spaced-apart flutes 22. The illustrated flutes 22 are radius grooves which is the preferred shape but, in certain applications, they also may be narrow slots. These flutes 22 provide telescopic rigidity to the skirt 21 and the lower portion of the cavity 12, thereby avoiding an inward bellows action when the lid is applied to the container.

The relatively flat portions 23 of the skirt 21 between the flutes act as lands, which are cammed outwardly by the bead 13, when the lid is pressed downwardly on the container 15, without digging in or marring the bead. To this end the lands 23 have sufficient conical strength structurally to cause the flutes to expand circumferentially or diametrically, that is, the width of the lands 23 vary between the lower and upper portions thereof. Each land 23 has a wider circumferentially extending lower portion 37 (FIG. 4) at the lower free end of the skirt 21 than at an upper or innermost portion 39.

The lands 23 are connected to lower rounded portions 43 of the rim-receiving cavity 12. The lower rounded portions 43 of the cavity 12 form hooks or latches that snap over the bead 13 and apply a slight tightening down camming action to hold the lid against inadvertent separation from the container 15. The lower rounded portions 43 extend inward approximately to one-half the width of the cavity 12. For the purpose of facilitating the camming and snapping action of the hooks 43 on the container bead 13, the lower rounded portions 43 are formed with a downwardly curved surface disposed at an angle of about 43° to the horizontal as exemplified by the angle A in FIG. 4. With a smaller angle it would be difficult to remove the lid from the mold.

The waist is expanded by the narrower upper portions 39 of the lands 23 being cammed laterally outwardly. This camming action causes the walls forming the adjacent flutes 22 to be distorted and the rounded portions 43 to roll outward. The increased intermediate widths of the flutes 22 and the nonparallelism of the land-defining walls also aid in the flexing to accommodate the bead 13. The camming action is facilitated by providing the land 23 at a small angle relative to the vertical (angle B in FIG. 3) preferably at an angle not greater than about 31°.

The pivoting of the land 23 and the outward rolling of the rounded portions 43 to expand the waist are further enhanced by having the tops of the flutes 22 joined to the rim-receiving cavity 12 as close as possible to a point of tangency with the inner surface of the cavity 12, as best seen in FIG. 3. If the tops of the flutes 22 were made tangential to the cavity 12, the flutes 22 would extend further upwardly to the center of the cavity 12 and thereby provide passageways between the rim and cavity wall through which liquid might leak. The preferred angle for the point of connection of the flutes 22 to the cavity 12 is at an angle of about 15°–20° from a horizontal plane, as illustrated by the angle C in FIG. 3.

As previously explained, beads 13 are formed by a rolling of the material which results in noncircular cross sections and sometimes results in flats, bulges or other variable cross-sectional dimensions in the beads. In seamed containers, the double thickness of the material at the seam causes an enlargement or bulge. It has been found that containers may have a tolerance in the height of the bead of 0.025 inches. To seal with beads 13 having such variations, the cavity 12 is formed with a vertical dimension, i.e., a height, to receive the maximum tolerance dimension of a container bead. Additionally, an upper rounded wall 45 (FIG. 3) of the cavity 12 is blended into a flat vertically disposed outer wall 49 with the result that the cavity 12 is elongated in the vertical direction. The inner diameter of the vertical wall 49 is selected to be slightly less than the minimum tolerance diameter of the bead 13 or that of the minimum tolerance diameter of the bead with interference. The flatness of the cavity 12 provided by the vertical wall permits the cavity to bulge where needed.

The upper arcuate wall 45 is joined at its inner end with an upwardly facing curved surface 53 at the lower edge of the corrugated ring 25. The corrugated ring 25 extends inward and upward from its lower edge and includes a plurality of corrugations 57 each of which has a substantially uniform circumferential extent and decreases in height. The sides of the corrugations 57 are radially disposed, the corrugations thereby being wider at the outer ends than the inner ends.

The corrugated ring allows the upper wall 45 of the cavity to roll upwardly and outwardly to accommodate variations in the bead diameter. Also, the upwardly curved surface 53 readily deforms in a localized area as the corrugated ring 25 spreads circumferentially and flexes upwardly whereby the lid may fully seat and grip despite bulges or other such enlargements. The corrugated ring 25 also allows the lid to be easily removed from the container without any abrupt or jarring action by placing two or more fingers on top of the lid, near the edge of the panel 17, and the thumb under the lower edge of the skirt 21 and gently squeezing between the thumb and fingers simultaneously with a prying action.

The corrugated ring 25 is connected to the center panel 17 by means of a conical-shaped collar or tapered cylinder 55. The angle between the face of the center panel 17 and the collar (angle D in FIG. 3) is made greater than 90° and the angle between the collar 55 and the upper surface of the corrugated ring 25 (angle E in FIG. 3) is made approximately 90° so that the lid does not permanently buckle. Alternately, the angles may be interchanged (i.e., angle D may be made 90° and angle E may be made greater than 90°. Also, this collar 55 facilitates the rolling of the cavity 12.

Figure 1:
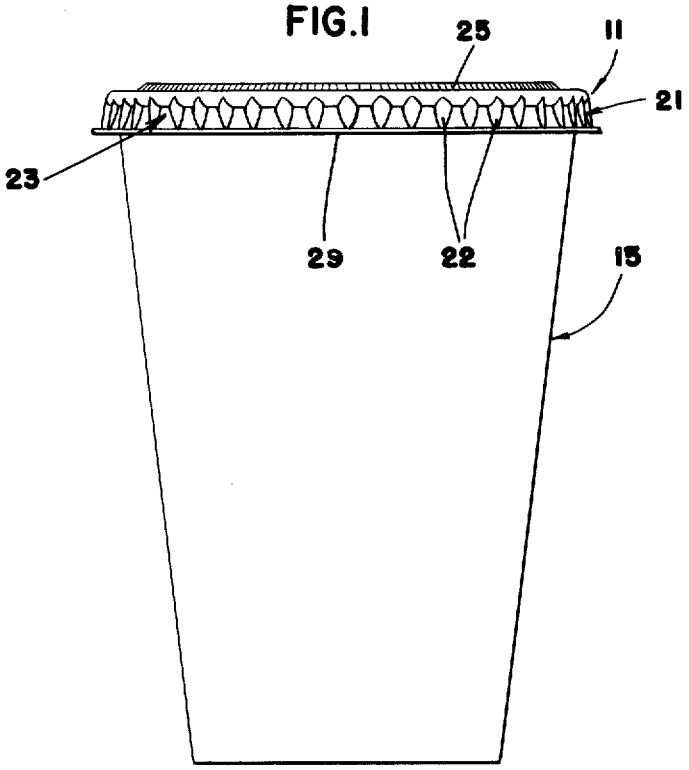
FIG. 1 is a perspective view of a container having an attached lid embodying the features of the invention.
Figure 2:
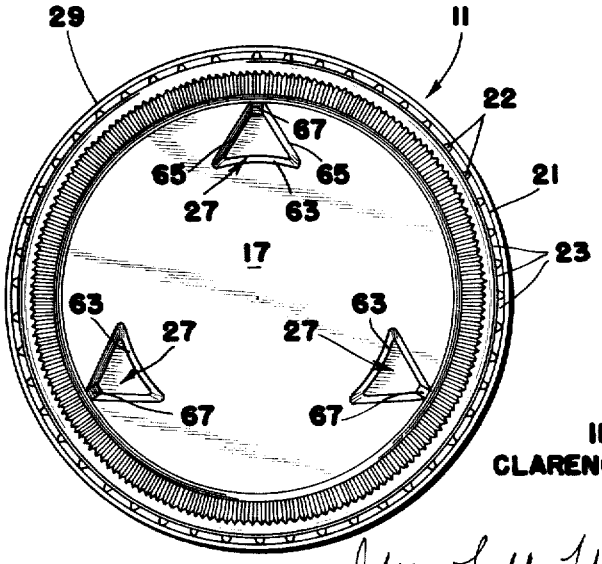
FIG. 2 is a top view of the lid of FIG. 1.

The preferred manner of stacking is by means of three spaced stacking lugs 27, each in the shape of an oblique frustum of a triangular pyramid with the edges of faces flattened or rounded. The lugs are integrally formed in and project downwardly from the top panel 17 to a position in horizontal plane beneath the plane of lower portions 43 of the cavity 21. More particularly, the bottom walls 61 on the stacking lugs 27 abut the central panel 17 of a lid immediately below to space the skirt 21 from engaging and prevent its moving into a wedging engagement with the outer surface of the lid cavity 12. As illustrated in FIG. 2, the stacking lugs are each positioned so that one corner 67 thereof is directed outwardly so that, when the plastic material from which the lid is thermoformed shrinks upon cooling, the lid is easily stripped from the mold.

The preferred equipment for forming a series of lids simultaneously from a sheet of plastic has the stacking lugs angularly spaced at different angles in the various lid forming dies so that the lids when formed have the stacking lugs in a series of nonmatchable positions. Thus, each group of lids formed from a single sheet may be stacked immediately without having the bottom walls 61 of one lid aligned and projecting into the openings of the stacking lugs in the lid next below.

From the foregoing, it will be seen that the lid may be manufactured by thermoforming or pressured formed from a sheet of plastic and provided with sufficient flexibility at the depending skirt to fit containers having bead diameters which vary substantially over a relatively wide range of tolerances. The lids are particularly suited for accommodating bulges at the seams or other nonuniform cross sections in roller beads. The lids may be readily stacked yet are prevented from wedging into engagement with one another which would prevent the easy release of one lid from another.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What I claim is:

1. A lid for gripping and sealing engagement with a container having a bead about an upper edge thereof, said lid comprising a central panel, means defining an inwardly opening, circumferentially extending cavity on said lid at a position radially outwardly of said central panel to receive said bead and to abut said bead in sealed engagement, means connecting said cavity to the outer edge of said panel, a conical skirt extending downward and outward from the lower edge of said cavity defining means and terminating a free end having a diameter larger than the diameter of said bead, whereby the upper portion of said skirt and the lower portion of said cavity defining means from a waist, and a series of circumferentially spaced flutes, interrupting said waist, the portions of said skirt between said flutes acting as lands when the lid is telescoped on a container, each of said lands having a decreasing circumferential extent from a lower portion to an inner portion thereof to facilitate flexing of said land radially outward when cammed by the container bead, the lower portion of said cavity defining means being moveable into position beneath said bead to grip the latter when the lid is fitted on said container.

2. A lid in accordance with claim 1 in which said cavity-defining means is elongated in the vertical direction to accommodate bulges in the container bead.

3. A lid in accordance with claim 1 in which said connecting means includes a flexible annular corrugated ring disposed between said central panel and said cavity-defining means, each of the corrugations in said ring being tapered on height with the higher ends outermost.

4. A lid in accordance with claim 3 in which said flutes project upwardly into said cavity-defining means to a point immediately below a tangential line to said cavity-defining means.

5. A lid in accordance with claim 4 in which the waist extends inward to about one-half of the width of said cavity and the skirt extends downward at an angle of less than about 31° to the vertical plane.

6. A lid in accordance with claim 1 in which stacking lugs in the shape of oblique frustums of triangular pyramids depend from said central panel and into the area defined by said skirt for resting on another central panel of another lid when stacked therewith, said lugs having one corner thereof directed outward.

7. A lid in accordance with claim 5 in which said connecting means includes a tapered collar connecting the inner end of the corrugations to the central panel.

8. A lid for gripping and sealing engagement with an open mouth container having an annular bead about the upper edge thereof, said lid comprising a central panel extending substantially across the mouth of the container, a conical-shaped collar joined to outer edge of said panel, a ring having radially extending corrugations joined to and projecting outward and downward from said collar, said corrugations being tapered in height with the higher ends being outermost, a circumferentially extending cavity defining means joined to said ring and elongated in the vertical direction to receive said container bead and to have a sealed engagement therewith, a conical skirt depending from said cavity defining means and projecting downwardly and outwardly to a free end having a diameter larger than that of said container bead, whereby the lower portion of said cavity-defining means and the upper portion of said skirt forms a waist and a series of flutes interrupting said waist, the portions of said skirt between said flutes acting as lands when the lid is telescoped on the container, each of said lands having a decreasing circumferential dimension in the upward direction and flexing outward about the lower and wider portion of said land to permit telescoping of said lid on said container bead, said lower portion of said cavity-defining means flexing inward and beneath said bead when said lid is telescoped on said container to grip therewith and hold said lid in sealed engagement with said container bead.

9. A lid in accordance with claim 8 in which stacking lugs in the shape of oblique frustums of triangular pyramids depend from said central panel into the area defined by said skirt for resting on another central panel of another lid when stacked therewith, said lugs having one corner thereof directed outward.

10. A lid in accordance with claim 8 in which the waist extends inward about one-half the radial width of said cavity.

*11. A lid for gripping and sealing engagement with a container having a bead about an upper edge thereof, said lid comprising a central panel, means defining a circumferentially extending cavity on said lid at a position radially outwardly of said central panel to receive said bead and to abut said bead in sealed engagement, means connecting an inner end of said cavity defining means to the outer edge of said panel for permitting said inner end to flex and to expand the cavity radially outwardly during application to a container bead, a conical skirt extending downwardly and outwardly from a lower edge of said cavity defining means and terminating in a free end having a diameter larger than the diameter of said bead*

*an upper portion of said skirt and the lower edge of said cavity defining means forming a waist having a diameter less than the outer diameter of the container bead, a series of circumferentially spaced flutes interrupting said waist, said flutes having a decreasing depth from said waist toward said free end of said conical skirt, and surfaces of decreasing circumferential extent in the upward direction on portions of said skirt between said flutes acting as lands for camming engagement with the container bead when the lid is forced onto a container, said means being being located downwardly of said connecting means and radially inwardly of the outermost portion of said cavity thereby defining an inwardly directed access opening into said cavity for the bead, said waist being positioned to engage the bead and to be forced radially outwardly during movement of said bead through said access opening, the outward movement of said waist forcing an upper wall of said cavity defining means to roll outwardly which forces said connecting means upwardly, and said waist returning to a position beneath said bead to grip the latter and the radially outer end of said connecting means positioned adjacent the bead when said bead is projected into said cavity.*

*12. A lid in accordance with claim 11 in which said flutes have an increasing width in said conical skirt from their lower ends to said waist.*

*13. A lid in accordance with claim 12 in which said connecting means includes a flexible annular corrugated ring disposed between said central panel and said cavity defining means.*

*14. A lid in accordance with claim 11 in which said lands are generally flat and generally trapezoidal in shape.*

*15. A lid in accordance with claim 11 in which said waist extends inward to about one-half the width of said cavity and the skirt extends downward at an angle of less than about 31° to the vertical plane.*

*16. A lid for gripping and sealing engagement with a container having a bead about an upper edge thereof, said lid comprising a central panel, a cavity defining wall extending circumferentially on said lid at a position radially outwardly of said central panel to receive said bead therein, a conical skirt extending downward and outward from the lower edge of said cavity defining means and terminating in a free end having a diameter larger than the diameter of said bead, said conical skirt joining a lower and radially outwardly end of said cavity defining wall at a waist located substantially beneath the center of said cavity to grip the underside of a bead inserted therein, a radially inner end of said cavity wall being spaced upwardly and radially inwardly of said waist, a connecting wall extending circumferentially between said central panel and said inner end of said cavity defining wall, said connecting wall extending upwardly and inwardly from said inner end of said cavity to the outer edge of said central panel, said inner and outer ends of said cavity wall defining an access opening directed inwardly and a series of circumferentially spaced flutes interrupting said waist, and the portions of said skirt between said flutes acting as lands as said bead forces said waist outwardly and rolls the upper wall portion of said cavity defining wall in an upward and outward direction as said bead is being forced through said access opening and into said cavity, the radially outer end of said connecting means being disposed adjacent said bead when said lid is positioned on said container, said lands having a decreasing circumferential extent in an upward direction and said flutes having a decreasing depth from said waist toward said free end of said conical skirt.*

*17. A lid in accordance with claim 16 formed of one piece and thermoformed from a sheet of plastic of uniform cross-sectional thickness.*

*18. A lid in accordance with claim 17 in which spaced stacking lugs are formed in said central panel for resting on the central panel of another lid when stacked therewith.*

*19. A lid in accordance with claim 16 in which saia connecting means comprises a flexible annular corrugated ring disposed between said central panel and saia cavity defining means.*

* * * * *

UNITED STATES PATENT AND TRADEMARK OFFICE

CERTIFICATE OF CORRECTION

PATENT NO. : Reissue 28797

DATED : May 4, 1976

INVENTOR(S) : Clarence T. Brewer

It is certified that error appears in the above-identified patent and that said Letters Patent are hereby corrected as shown below:

Column 2, line 56, "shwon" should be --shown--.

Column 5, line 67, "being tapered on height" should be --being tapered in height--.

Column 7, line 11, "means being being located" should be --said waist being located--.

Column 7, line 22, "connecting means positioned" should be --connecting means being positioned--.

Signed and Sealed this

Thirteenth Day of July 1976

[SEAL]

*Attest:*

RUTH C. MASON
*Attesting Officer*

C. MARSHALL DANN
*Commissioner of Patents and Trademarks*